(12) United States Patent
Lee et al.

(10) Patent No.: US 10,271,307 B2
(45) Date of Patent: Apr. 23, 2019

(54) METHOD AND DEVICE FOR DENYING TRANSMISSION BY TERMINAL IN WIRELESS COMMUNICATION SYSTEM

(71) Applicant: LG Electronics Inc., Seoul (KR)

(72) Inventors: Jaewook Lee, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 15/524,138

(22) PCT Filed: Nov. 4, 2015

(86) PCT No.: PCT/KR2015/011760
§ 371 (c)(1),
(2) Date: May 3, 2017

(87) PCT Pub. No.: WO2016/072727
PCT Pub. Date: May 12, 2016

(65) Prior Publication Data
US 2017/0339671 A1   Nov. 23, 2017

Related U.S. Application Data

(60) Provisional application No. 62/076,439, filed on Nov. 6, 2014.

(51) Int. Cl.
*H04W 72/02*  (2009.01)
*H04W 72/12*  (2009.01)
(Continued)

(52) U.S. Cl.
CPC ....... *H04W 72/02* (2013.01); *H04W 72/0446* (2013.01); *H04W 72/085* (2013.01);
(Continued)

(58) Field of Classification Search
CPC ............ H04W 72/02; H04W 72/0446; H04W 72/085; H04W 72/12; H04W 88/16; H04W 88/02
(Continued)

(56) References Cited

U.S. PATENT DOCUMENTS 9,337,987 B1 *  5/2016  Choi ................. H04W 28/04
2013/0114583 A1  5/2013  Park et al.
(Continued)

FOREIGN PATENT DOCUMENTS

WO   2014022959 A1   2/2014
WO   2014069838 A1   5/2014

OTHER PUBLICATIONS

3GPP TS 36.331 V12 3.0, "3GPP, TSG RAN, E-EUTRA: RRC, Protocol specification (Release 12)", Sep. 23 2014, pp. 70-71, 290.
(Continued)

*Primary Examiner* — Kwang B Yao
*Assistant Examiner* — Syed M Bokhari
(74) *Attorney, Agent, or Firm* — Dentons US LLP

(57) ABSTRACT

Provided is a method for denying transmission by a terminal in a wireless communication system. A terminal may receive an effective period and a threshold value, count the number of autonomous denial subframes during the effective period, and deny transmission in a current subframe if the counted number of the autonomous denial subframes is less than the threshold value.

9 Claims, 18 Drawing Sheets

(51) Int. Cl.
*H04W 72/04* (2009.01)
*H04W 72/08* (2009.01)
*H04W 88/02* (2009.01)
*H04W 88/16* (2009.01)

(52) U.S. Cl.
CPC ............ *H04W 72/12* (2013.01); *H04W 88/02* (2013.01); *H04W 88/16* (2013.01)

(58) Field of Classification Search
USPC ................................................ 370/329, 252
See application file for complete search history.

(56) References Cited

U.S. PATENT DOCUMENTS

| | | | |
|---|---|---|---|
| 2014/0092761 A1* | 4/2014 | Behravan | H04W 24/02 370/252 |
| 2014/0198672 A1 | 7/2014 | Koo et al. | |
| 2015/0195848 A1* | 7/2015 | Hong | H04W 72/1215 455/450 |
| 2017/0026865 A1* | 1/2017 | Behravan | H04W 24/02 |

OTHER PUBLICATIONS

Intel Corporation, "Dual connectivity and in-device coexistence", R2-144143, 3GPP TSG RAN WG2 Meeting #87bis, Sep. 26, 2014, pp. 1-4.

Samsung, "IDC issues in Dual connectivity", R2-144441, 3GPP TSG RAN WG2 Meeting #87bis, Sep. 26, 2014, pp. 1, 2.

* cited by examiner

METHOD AND DEVICE FOR DENYING TRANSMISSION BY TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2015/011760, filed on Nov. 4, 2015, which claims the benefit of U.S. Provisional Application No. 62/076,439 filed on Nov. 6, 2014, the contents of which are all hereby incorporated by reference herein in their entirety.

BACKGROUND OF THE INVENTION

Field of the Invention

The present invention relates to a wireless communication system, and more particularly, to a method for denying, by a user equipment (UE), uplink transmission or sidelink transmission in wireless communication system, and a device performing the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

Recently, there has been a growing interest in device-to-device (D2D) technology that enables direct communications between devices. In particular, D2D receives attention as a communication technology for public safety networks. Commercial communication networks are rapidly changing to LTE, while current public safety networks are mostly based on 2G technology due to a collision with existing communication specifications and costs. Such a gap in technology and demands for improved services result in efforts to improve public safety networks.

Public safety networks have higher service requirements (reliability and security) than commercial communications networks, and particularly requires direct signal transmission and reception between devices, that is, D2D operations, even beyond cellular communication coverage or even when cellular communication is unavailable.

D2D operations may have various advantages in terms of signal transmission and reception between adjacent devices. For example, D2D user equipments (UEs) are able to perform data communication at high transmission rate with low delay. Further, D2D operations may disperse traffic concentrated on a base station (BS) and may function to extend the coverage of a BS when a D2D UE serves as a relay.

A UE may operate by autonomously restricting transmission and reception during a specified subframe for various reasons, which is referred to as autonomous denial. Autonomous denial may be applied depending on in-device coexistence (IDC) interference by coexistence of an LTE module and a module for an ISM band. A frequency band used for communication through the LTE module may overlap a frequency band used for communication through the ISM band to cause interference. To prevent such interference, the UE may operate by changing to a frequency in a licensed band, which is not that for the ISM band, or may not perform uplink communication in a specified subframe. It is referred to as an autonomously denied operation that a UE does not perform uplink communication in a specified subframe.

SUMMARY OF THE INVENTION

The present invention provides a method for performing autonomous denial in a current subframe when the number of autonomously denied subframes is smaller than a threshold in a preset period, and a device supporting the same.

According to one embodiment, there is provided a method for denying, by a user equipment (UE), transmission in a wireless communication system. The method may include: receiving a validity period and a threshold; counting a number of autonomously denied subframes during the validity period; and denying transmission at a current subframe when the number of autonomously denied subframes is less than the threshold.

The threshold may be a maximum number of subframes assigned for uplink transmission which is allowed for the UE to deny scheduled uplink transmission, the number of autonomously denied subframes may be a number of subframes denied for uplink transmission, and the transmission may be uplink transmission.

The threshold may be a maximum number of subframes assigned for sidelink transmission which is allowed for the UE to deny scheduled sidelink transmission, the number of autonomously denied subframes may be a number of subframes denied for sidelink transmission, and the transmission may be sidelink transmission The threshold may be a maximum number of subframes assigned for uplink transmission and sidelink transmission which is allowed for the UE to deny scheduled uplink transmission and sidelink transmission, the number of autonomously denied subframes may be a number of subframes denied for uplink transmission and sidelink transmission, and the transmission may be uplink transmission and sidelink transmission.

The threshold may be a maximum number of subframes assigned for uplink transmission which is allowed for the UE to deny scheduled uplink transmission, the number of autonomously denied subframes may be a number of subframes denied for uplink transmission when uplink transmission and sidelink transmission occur at the same subframe, and the transmission may be uplink transmission.

The threshold may be a maximum number of subframes assigned for sidelink transmission which is allowed for the UE to deny scheduled sidelink transmission, the number of autonomously denied subframes may be a number of subframes denied for sidelink transmission when uplink transmission and sidelink transmission occur at the same subframe, and the transmission may be sidelink transmission.

The validity and the threshold may be received from a network through dedicated signaling or broadcast signaling, or may be received from the network through both dedicated signaling and broadcast signaling.

When the validity and the threshold are received from the network through both dedicated signaling and broadcast signaling, the validity and the threshold may be values received through dedicated signaling.

According to one embodiment, there is provided a user equipment (UE) for denying transmission in a wireless communication system. The UE may include: a memory; a transceiver; and a processor to connect the memory and the transceiver, wherein the processor may be configured to: control the transceiver to receive a validity period and a threshold; count a number of autonomously denied subframes during the validity period; and deny transmission at a current subframe when the number of autonomously denied subframes is less than the threshold.

The threshold may be a maximum number of subframes assigned for uplink transmission which is allowed for the UE to deny scheduled uplink transmission, the number of autonomously denied subframes may be a number of subframes denied for uplink transmission, and the transmission may be uplink transmission.

The threshold may be a maximum number of subframes assigned for sidelink transmission which is allowed for the UE to deny scheduled sidelink transmission, the number of autonomously denied subframes may be a number of subframes denied for sidelink transmission, and the transmission may be sidelink transmission.

The threshold may be a maximum number of subframes assigned for uplink transmission and sidelink transmission which is allowed for the UE to deny scheduled uplink transmission and sidelink transmission, the number of autonomously denied subframes may be a number of subframes denied for uplink transmission and sidelink transmission, and the transmission may be uplink transmission and sidelink transmission.

The threshold may be a maximum number of subframes assigned for uplink transmission which is allowed for the UE to deny scheduled uplink transmission, the number of autonomously denied subframes may be a number of subframes denied for uplink transmission when uplink transmission and sidelink transmission occur at the same subframe, and the transmission may be uplink transmission.

The threshold may be a maximum number of subframes assigned for sidelink transmission which is allowed for the UE to deny scheduled sidelink transmission, the number of autonomously denied subframes may be a number of subframes denied for sidelink transmission when uplink transmission and sidelink transmission occur at the same subframe, and the transmission may be sidelink transmission.

The validity and the threshold may be received from a network through dedicated signaling or broadcast signaling, or may be received from the network through both dedicated signaling and broadcast signaling.

When uplink transmission and sidelink transmission overlap in a preset period, sidelink transmission may preferentially be performed.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
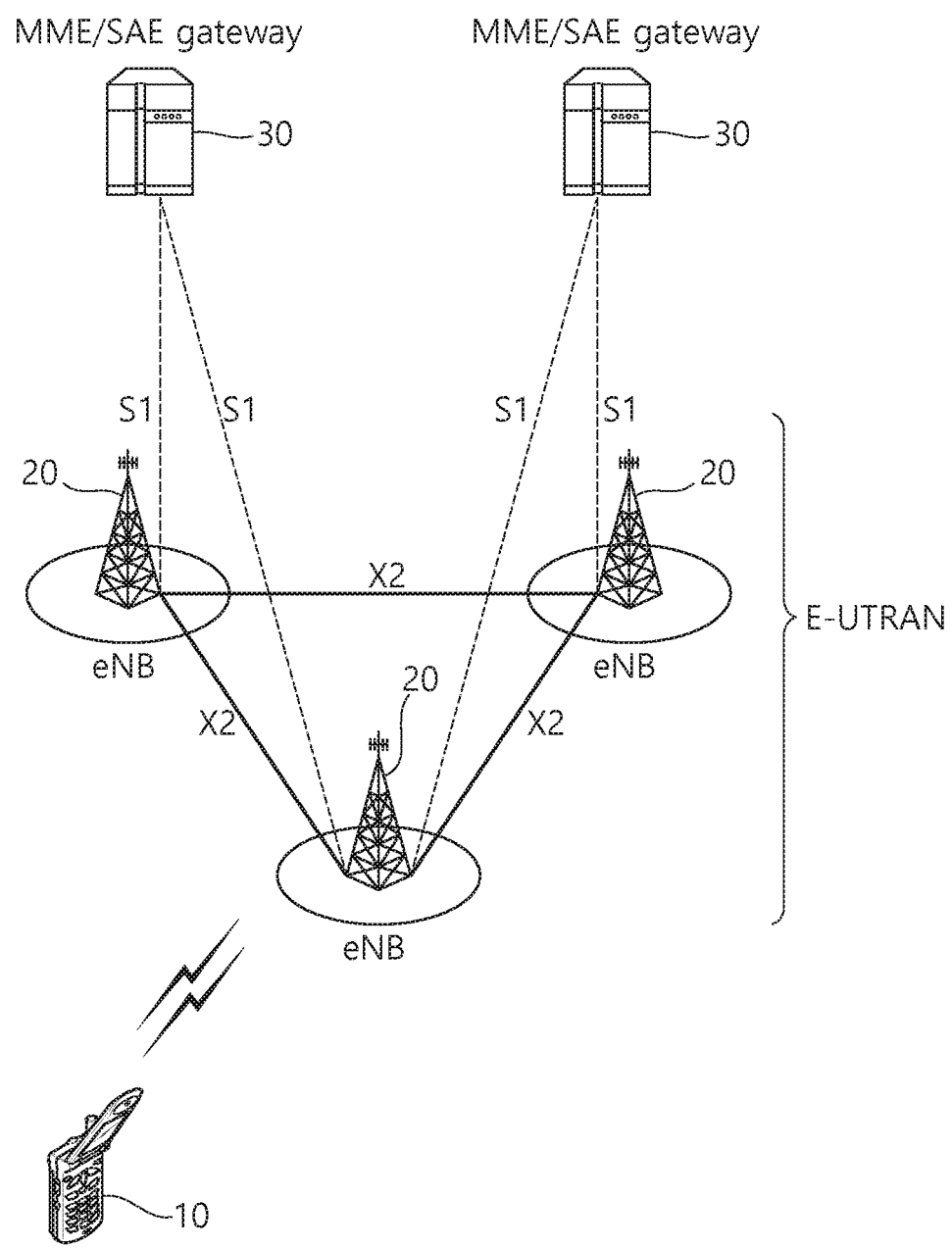
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
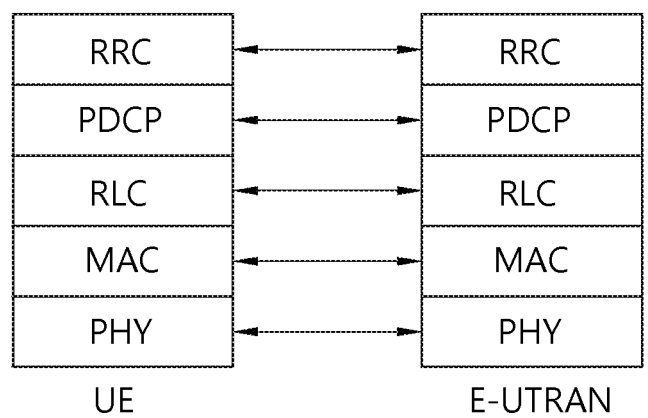
FIG. 2 shows a control plane of a radio interface protocol of an LTE system.
Figure 3:
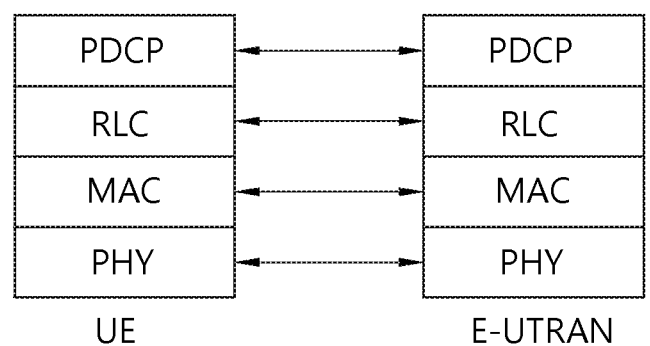
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
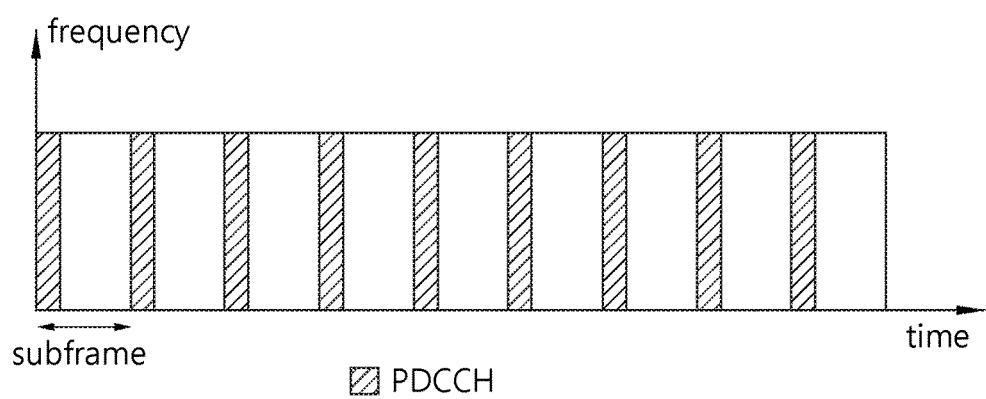
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Hereinafter, interference avoidance for in-device coexistence (IDC) is described.

Figure 5:
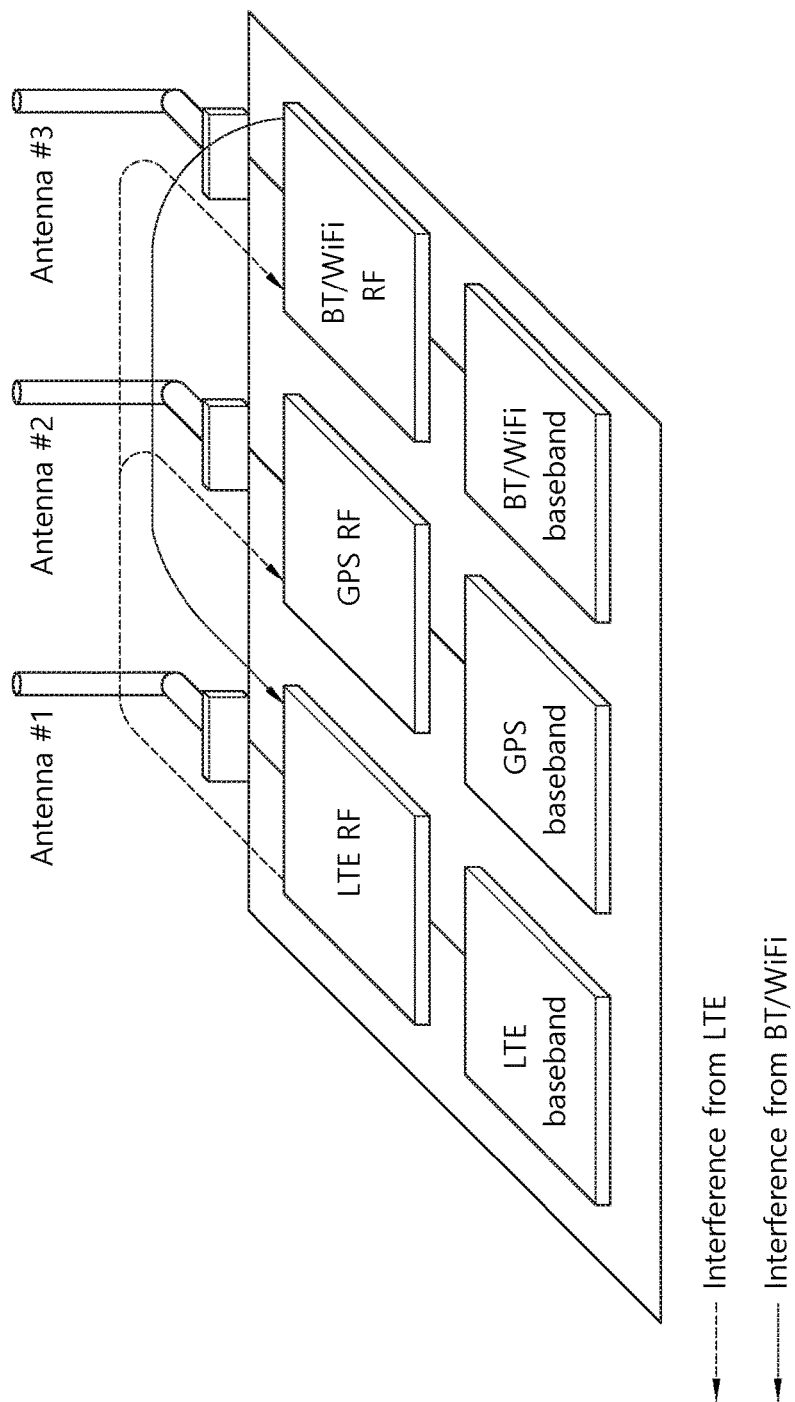
FIG. 5 shows an example of a situation in which LTE, GPS, and BT/WiFi operate within one UE to cause interference with each other.

FIG. 5 shows an example of a situation in which LTE, GPS, and BT/WiFi operate within one UE to cause interference with each other.

For a user to access diverse networks anytime anywhere, one UE needs to be equipped with transceivers for wireless communication systems including LTE, WiFi, and Bluetooth (BT) and a GNSS receiver. For example, a UE is equipped with LTE and BT modules to receive a VoIP service/multimedia service using BT earphones, a UE is equipped with LTE and WiFi modules for traffic dispersion, and a UE is equipped with GNSS and LTE modules to additionally obtain location information.

In terms of frequency, the foregoing communication modules operate in contiguous frequencies as follows to cause interference with each other.

- LTE TDD may operate in band 40 (2300 MHz to 2400 MHz), and WiFi and BT may operate in an unlicensed band (2400 MHz to 2483.5 MHz). In this case, LTE transmission may cause interference in WiFi and BT, while WiFi or BT transmission may cause interference in LTE reception.
- LTE FDD may perform uplink transmission in band 7 (2500 MHz to 2700 MHz), while WiFi and BT may operate in the unlicensed band (2400 MHz to 2483.5 MHz). In this case, LTE uplink transmission may cause interference in WiFi or BT reception.
- LTE FDD may perform uplink transmission in band 13 (UL: 777 to 787 MHz, DL: 746 to 756 MHz) or band 14 (UL: 788 to 798 MHz, DL: 758 to 768 MHz), while GPS radio may perform reception at 1575.42 MHz. In this case, LTE uplink transmission may cause interference in GPS reception.

As multiple transmitters and receivers are contiguous in one UE, the strength of power transmitted from one transmitter may be greater than the strength of received power of another receiver. Using a filtering technology or noncontiguous frequencies may prevent the occurrence of interference between the transmitter and the receiver (IDC interference). However, when a plurality of wireless communication modules within one UE operates at contiguous frequencies, a current filtering technology is unable to thoroughly eliminate interference. This problem needs to be solved in future for the coexistence of a plurality of transmitters and receivers for wireless communication modules in a UE.

IDC interference avoidance is broadly classified into three modes depending on whether there is coordination between an LTE module and other coexisting communication modules and whether there is coordination between the LTE module and a BS to address IDC interference. A first mode is a mode in which there is no coordination between coexisting communication modules and between an LTE module and a network for IDC interference avoidance. In this case, the LTE module has no information on other coexisting communication modules and thus may not properly deal with deterioration in service quality caused by IDC interference. A second mode is a mode in which there is coordination between coexisting communication modules in a UE. In this mode, the coexisting modules may know the on/off states and traffic transmission states of the coexisting modules with each other. In this mode, however, there is no coordination between the UE and a network. A last mode is a mode in which there is coordination not only between coexisting modules in a UE but also between the UE and a network. In this mode, not only the coexisting modules may know the on/off states and traffic transmission states of the coexisting modules with each other, but the UE may also notify the network of an IDC interference state so that the network may make a decision and takes a measure to avoid IDC interference.

An LTE module may measure IDC interference not only through coordination with other modules in a UE, as mentioned above, but also inter/intra-frequency measurement.

Currently, the 3GPP generally considers two approaches to address IDC interference. A first approach is a method in which a communication module causing interference or a communication module receiving interference changes a frequency (frequency division multiplexing: FDM). This method may be achieved through an existing handover procedure. A second approach is a method in which coexisting communication modules use one frequency by dividing time (time division multiplexing: TDM).

Figure 6:
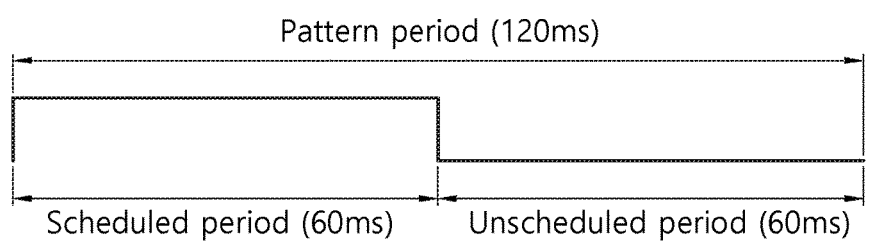
FIG. 6 shows an example of a TDM pattern.

FIG. 6 shows an example of a TDM pattern.

Referring to FIG. 6, TDM enables an LTE module to perform transmission and reception only in a scheduled period (60 ms) of the entire period (120 ms) and enables a different coexisting module to perform transmission and reception in an unscheduled period (60 ms). 120 ms and 60 ms are provided for illustrative purposes only and do not limit the present invention.

In order that a BS addresses an IDC interference problem occurring in a UE through FDM/TDM methods, the UE may notify the BS of necessary information for the BS to perform FDM/TDM when IDC interference occurs. This necessary information may include a frequency at which IDC interference occurs, pattern information for performing a TDM method, or the like.

Hereinafter, dual connectivity is described.

Figure 7:
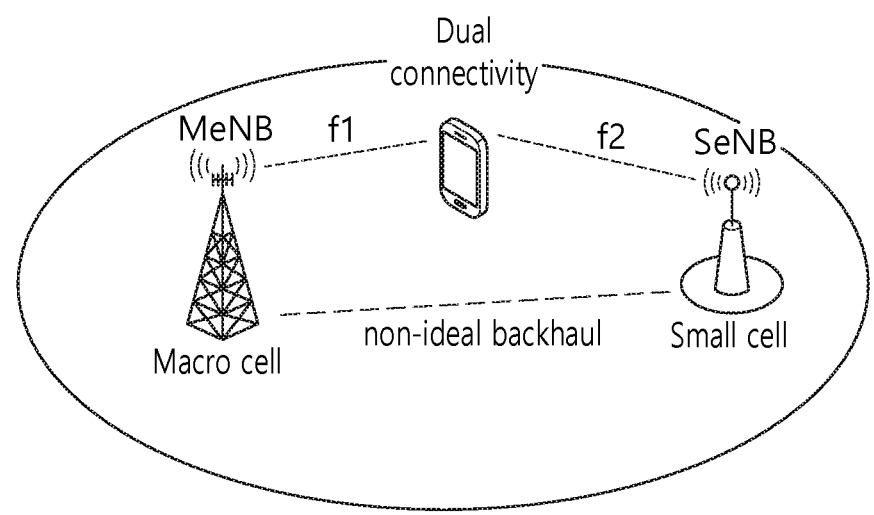
FIG. 7 shows an example of dual connectivity between a macrocell and a small cell.

FIG. 7 shows an example of dual connectivity between a macrocell and a small cell.

Referring to FIG. 7, a UE is connected to not only a macrocell but also a small cell. A macrocell eNB serving the macrocell is an MeNB in dual connectivity, and a small cell eNB serving the small cell is an SeNB in dual connectivity. The MeNB is an eNB terminating at least in an S1-MME and thus operates as a mobile anchor heading to a CN in dual connectivity. If a macro eNB is present, the macro eNB may generally function as an MeNB. The SeNB is an eNB providing an additional radio resource for the UE and is not an MeNB in dual connectivity. The SeNB is responsible for transmitting a best effort (BE) traffic type. The MeNB is responsible for transmitting a different traffic type, such as VoIP, streaming data or signaling data. An interface between the MeNB and the SeNB is referred to as an Xn interface. The Xn interface is assumed to be non-ideal (that is, the Xn interface may have a delay of up to 60 ms).

Figure 8:
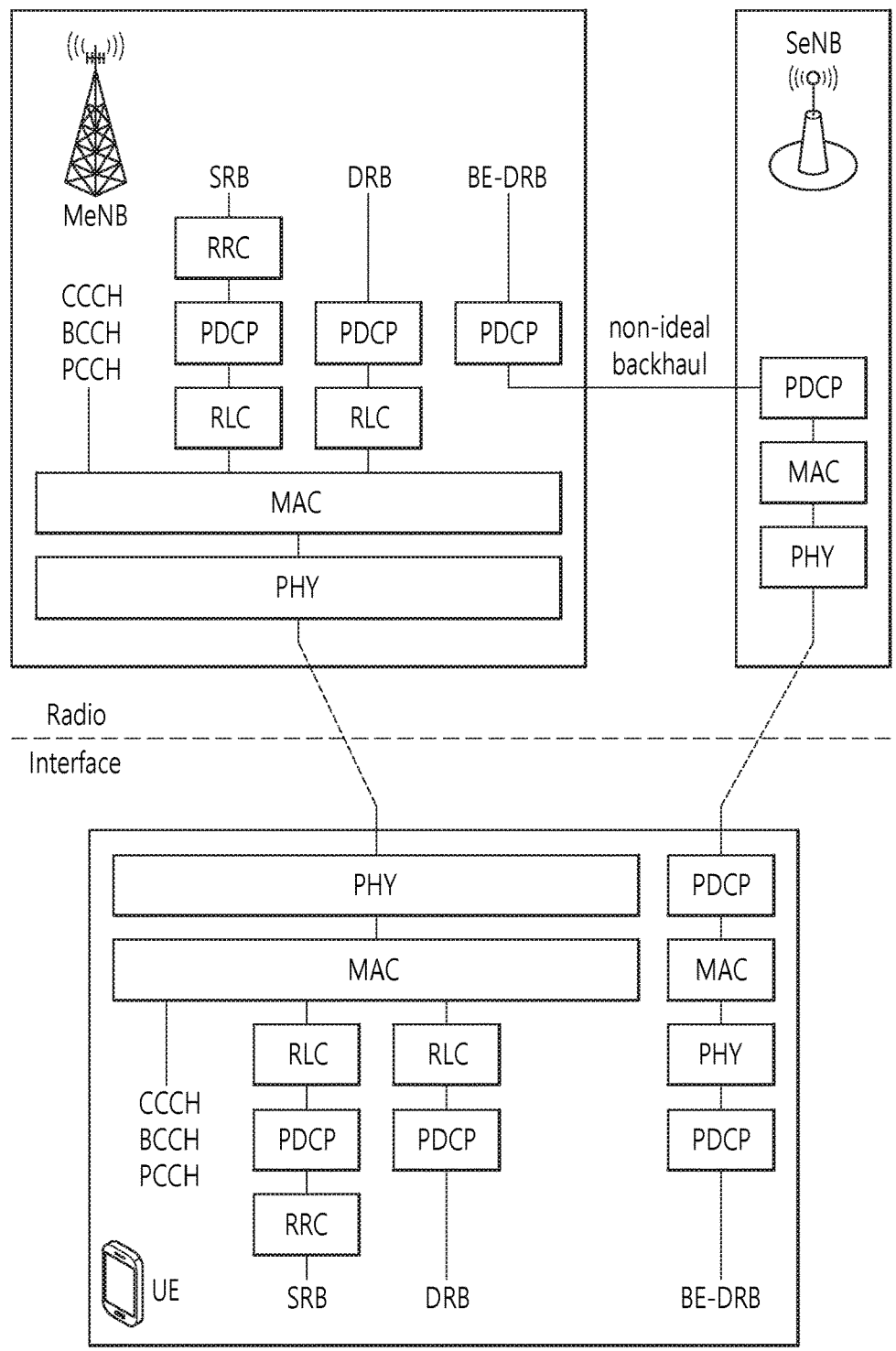
FIG. 8 shows an example of a protocol structure supporting dual connectivity.

FIG. 8 shows an example of a protocol structure supporting dual connectivity.

Various protocol structures are being studied to support dual connectivity. Referring to FIG. 8, PDCP and RLC entities are located at different network nodes. That is, the PDCP entity is located in an MeNB, and the RLC entity is located in an SeNB. From the perspective of a UE, the protocol structure is the same as used in the conventional technology except for an MAC entity configured for each eNB (that is, MeNB and SeNB).

Hereinafter, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction. The ProSe includes ProSe direction communication and ProSe direct discovery.

The ProSe direct communication is communication performed between two or more proximate UEs. The UEs may perform communication by using a protocol of a user plane. ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity. Hereinafter, for convenience, the ProSe direct communication may be referred to as D2D communication, and the ProSe direct discovery may be referred to as D2D discovery.

Figure 9:
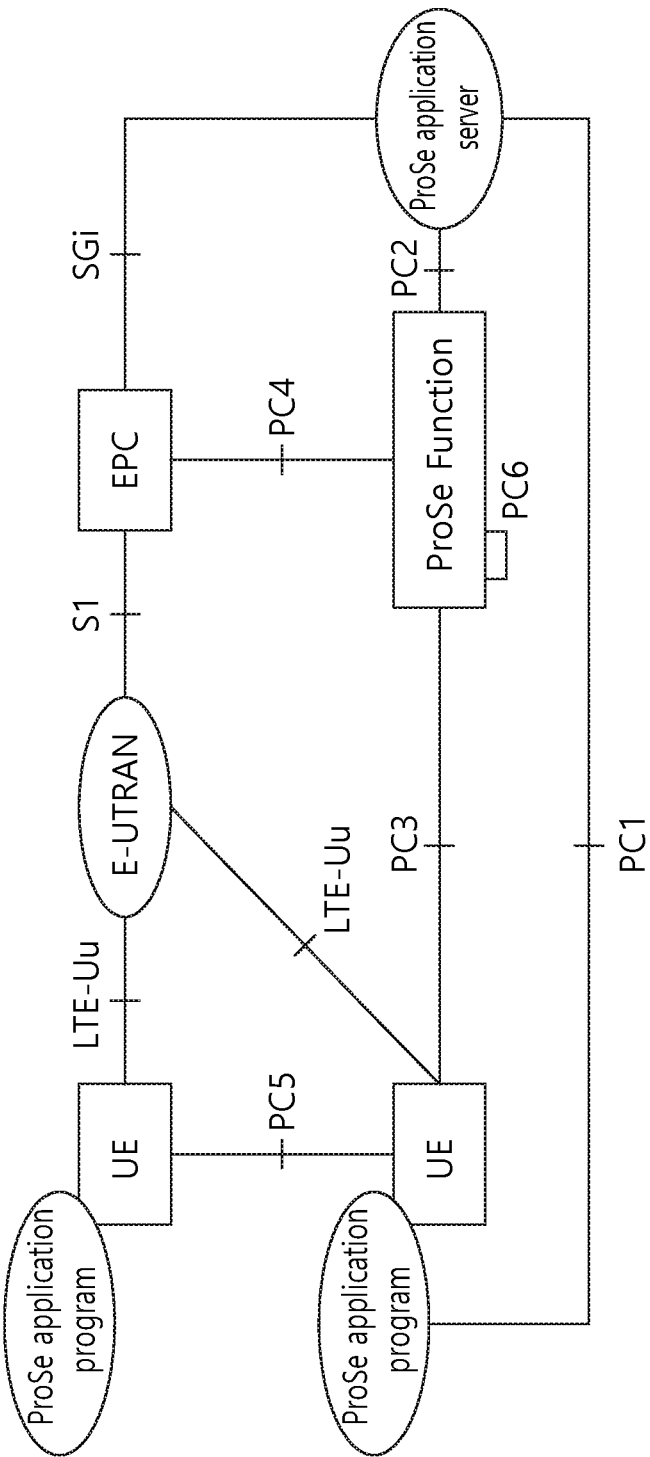
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function. The EPC represents an E-UTRAN core network configuration. The EPC may include an MME, an S-GW, a P-GW, a policy and charging rules function (PCRF), a home subscriber server (HSS) and so on. The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

Hereinafter, a reference point and a reference interface in the basic structure for ProSe are described.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

Hereinafter, ProSe Direct Communication is described.

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
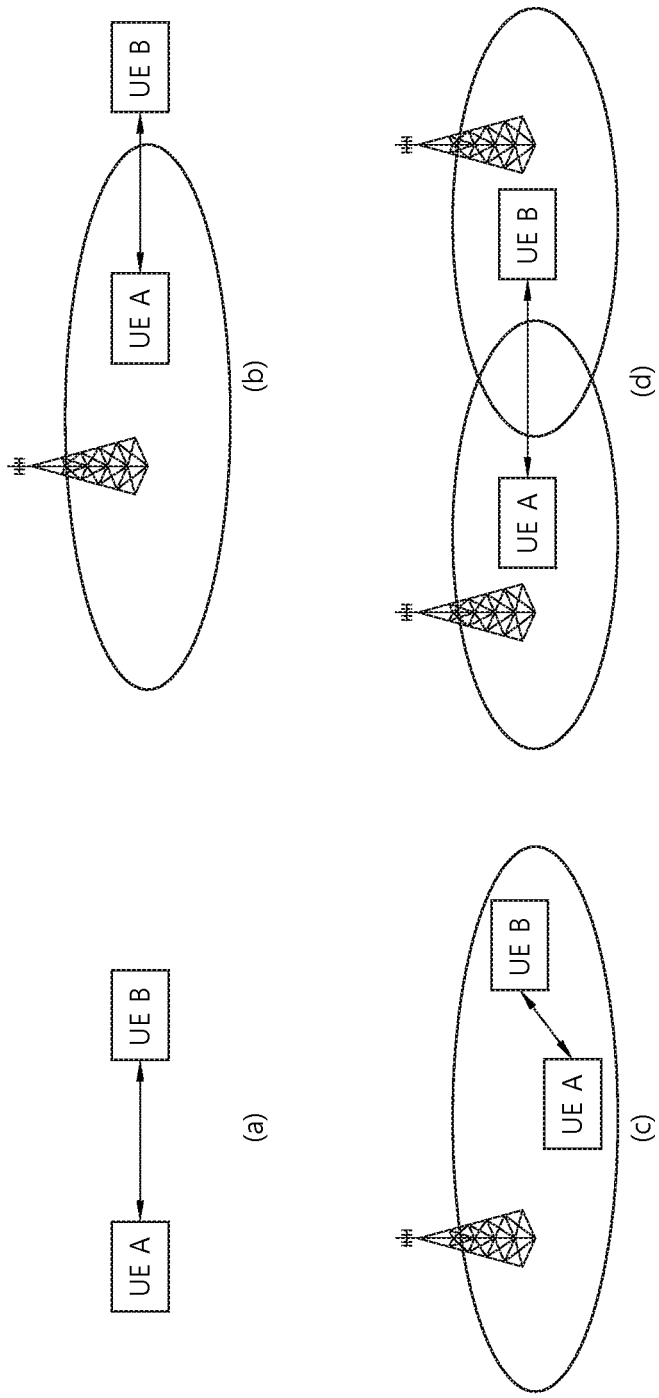
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell. ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
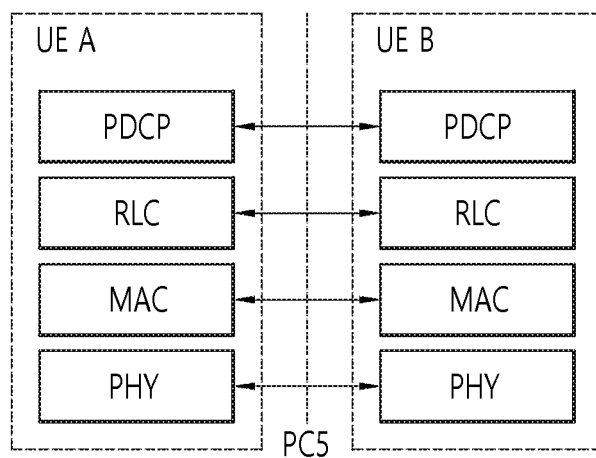
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers. In ProSe direct communication, HARQ feedback may not be present. An MAC header may include a source layer-2 ID and a destination layer-2 ID.

Hereinafter, Radio Resource Assignment for ProSe Direct Communication is described. ProSe-enabled UE may use the following two types of mode for resource assignment for ProSe direct communication.

1) Mode 1 is mode in which resources for ProSe direct communication are scheduled by an eNB. UE needs to be in the RRC CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2) Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC CONNECTED state with an eNB or is placed in a specific cell in the RRC_IDLE state, the UE is considered to be placed within coverage of the eNB. If UE is placed outside coverage, only mode 2 may be applied. If the UE is placed within the coverage, the UE may use mode 1 or mode 2 depending on the configuration of an eNB. If another exception condition is not present, only when an eNB performs a configuration, UE may change mode from mode 1 to mode 2 or from mode 2 to mode 1.

Hereinafter, ProSe Direct Discovery is described.

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
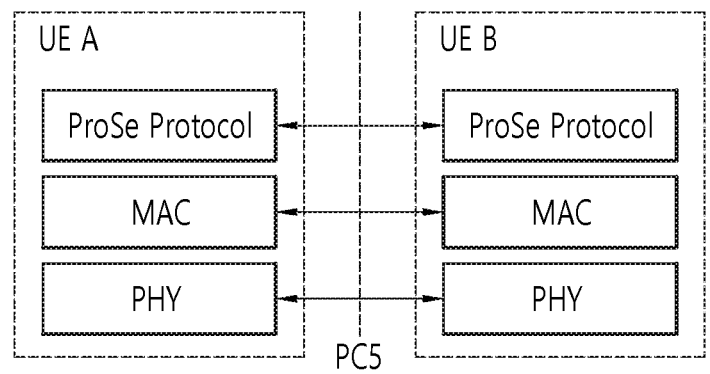
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1) The type 1 is a method for assigning a resource for announcing discovery information in a UE-not-specific manner. An eNB provides a resource pool configuration for discovery information announcement to types of UE. The configuration may be signaled through the SIB. UE autonomously selects a resource from an indicated resource pool and announces discovery information using the selected resource. The UE may announce the discovery information through a randomly selected resource during each discovery period.

2) The type 2 is a method for assigning a resource for announcing discovery information in a UE-specific manner UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
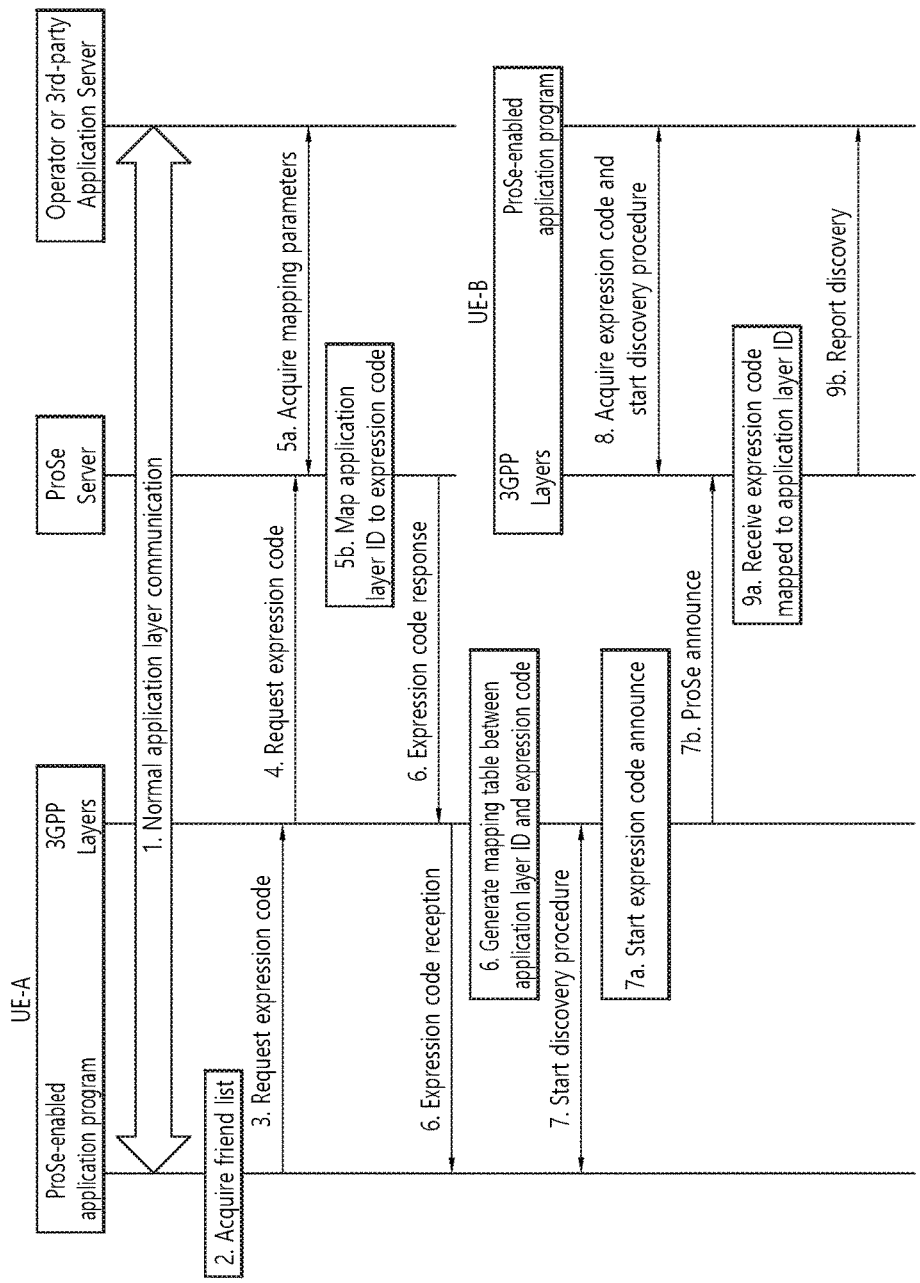
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1) First, the UE A performs regular application layer communication with the APP server. The communication is based on an Application Program Interface (API).

2) The ProSe-enabled application program of the UE A receives a list of application layer IDs having a 'friend' relation. In general, the application layer ID may have a network access ID form. For example, the application layer ID of the UE A may have a form, such as "adam@example.com."

3) The UE A requests private expressions code for the user of the UE A and private representation code for a friend of the user.

4) The 3GPP layers send a representation code request to the ProSe server.

5) The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6) The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7) The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8) It is assumed that the UE B operates the same ProSe-enabled application program as the UE A and has executed the aforementioned 3 to 6 steps. The 3GPP layers placed in the UE B may execute ProSe discovery.

9) When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
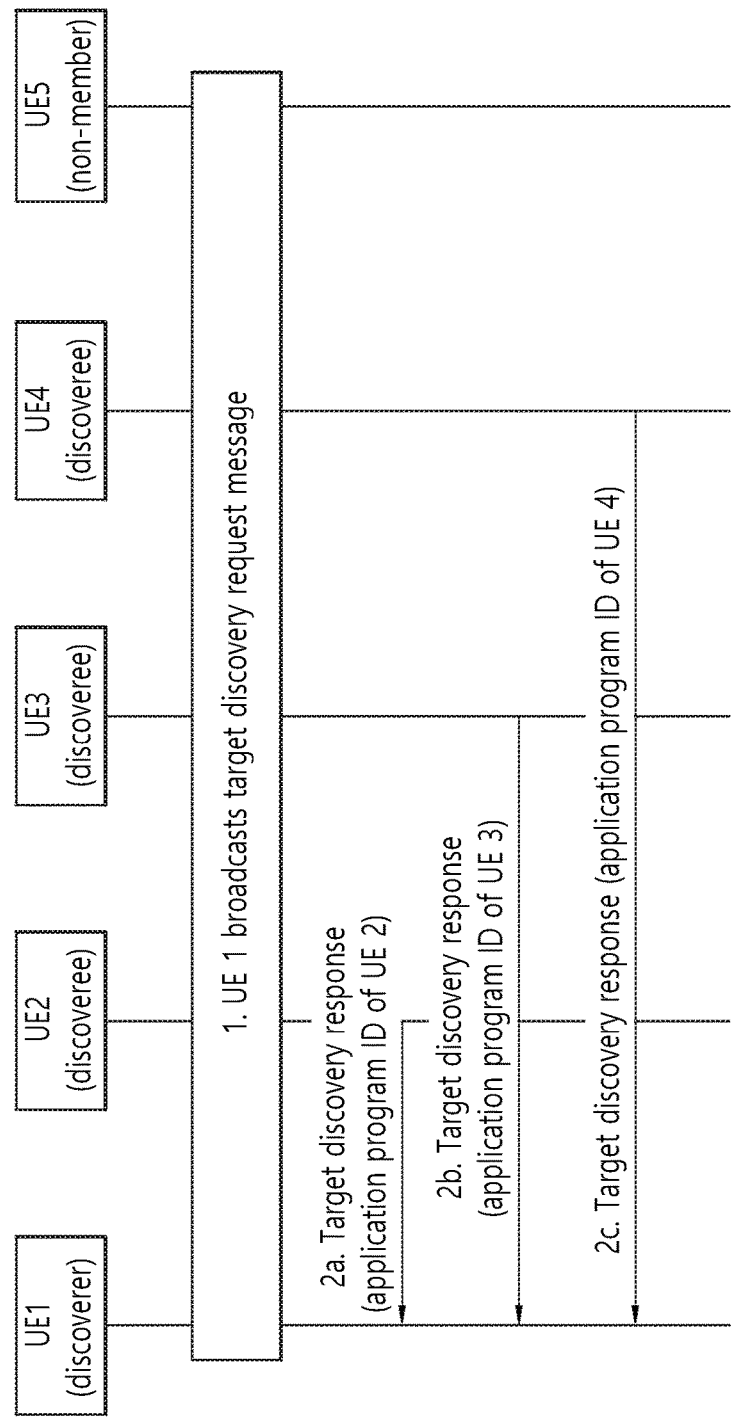
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process. First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

Hereinafter, the present invention is described. In the following description, 'sidelink' may be used with the same meaning as 'D2D' mentioned above.

Currently, autonomous denial for uplink transmission is defined in the standard. With the introduction of sidelink transmission, sidelink transmission may interfere in WiFi, BT or GNSS reception, while WiFi or BT transmission may interfere in sidelink reception. However, there is no autonomous denial for these scenarios.

Hereinafter, an embodiment of the present invention proposes a method of autonomously denying sidelink transmission to avoid interference between sidelink and WiFi/BT/GNSS. Further, there is provided a method of denying Uu-interface transmission when sidelink transmission and Uu-interface transmission overlap.

First, interference prevention using the number of autonomously denied subframes is described.

When reception of a different communication module (for example, WiFi/BT/GNSS) in a UE is expected to receive or receives interference by sidelink transmission, the UE may count the number of denials of subframes for sidelink transmission during a validity period including previous subframes and a current subframe, and may deny scheduled sidelink transmission at the current subframe when the number of denials of subframes for sidelink transmission is less than a threshold. Sidelink scheduling may be performed by a BS or autonomously by the UE. The threshold may be the maximum number of subframes assigned for sidelink transmission which is allowed for the UE to deny the scheduled sidelink transmission. The threshold and the validity period may be configured by a network through dedicated and/or broadcast signaling. For the foregoing configuration, the UE may report that reception of a different communication module (e.g. WiFi/BT/GNSS) in the UE may receive interference by sidelink transmission. When the UE has a plurality of scheduled transmission types (for example, uplink transmission and sidelink transmission) and reception of a different communication module in the UE receives interference by a plurality of types of transmissions, the UE may autonomously deny all of the plurality of types of transmissions including sidelink transmission causing interference in the reception of the different communication module in the UE. To this end, the threshold and validity period may be one common threshold and validity period or link-specific threshold and validity period. The threshold may be a link-specific threshold, and the validity period may be one common period. Hereinafter, a case where the threshold and the validity period are one common threshold and one common validity period and a case where the threshold and the validity period are a link-specific threshold and a link-specific validity period are described.

1) When the threshold and the validity period are one common threshold and one common validity period, the UE may count the number of denials of subframes for any scheduled transmission (including sidelink transmission and uplink transmission) during the validity period including the previous subframes and the current subframe. When denials for sidelink transmission and uplink transmission occur at the same subframe, the UE may count the denials as one denial or may count the denials as two denials. When the number of denials of subframes for sidelink transmission and uplink transmission is less than the threshold, the UE may deny any scheduled transmission at the current subframe. That is, the UE may deny sidelink transmission or scheduled uplink transmission at the current subframe or may deny both sidelink transmission and scheduled uplink transmission at the current subframe.

2) When the threshold and the validity period are a link-specific threshold and a link-specific validity period, the UE may separately count the number of denials of subframes for sidelink transmission and the number of denials of subframes for uplink transmission during the validity period including the previous subframes and the current subframe. Link-specific thresholds for the respective links may be the same or different. When the number of denials of subframes for sidelink transmission is less than a threshold for sidelink transmission, the UE may deny scheduled sidelink transmission at the current subframe. When the number of denials of subframes for uplink transmission is less than a threshold for uplink transmission, the UE may deny scheduled uplink transmission at the current subframe.

The UE may perform autonomous denial using a subframe denial rate, where the denial rate may be defined by the value of the number of autonomously denied subframes divided by an autonomous denial validity period.

Next, overlapping of Uu-interface transmission and sidelink transmission is described. When Uu-interface (for example, uplink) transmission and sidelink transmission overlap, a UE may deny Uu-interface transmission. That is, when sidelink transmission and scheduled uplink transmission overlap at a current subframe, the UE may perform only sidelink transmission by denying uplink transmission. Here, the UE may count the number of denials of subframes for uplink transmission during a validity period including previous subframes and the current subframe, and may deny scheduled uplink transmission at the current subframe when the number of denials of subframes for uplink transmission is less than a threshold. The threshold may be the maximum number of subframes assigned for uplink transmission which is allowed for the UE to deny the scheduled uplink transmission. The threshold and the validity period may be configured by a network through dedicated and/or broadcast signaling.

Figure 15:
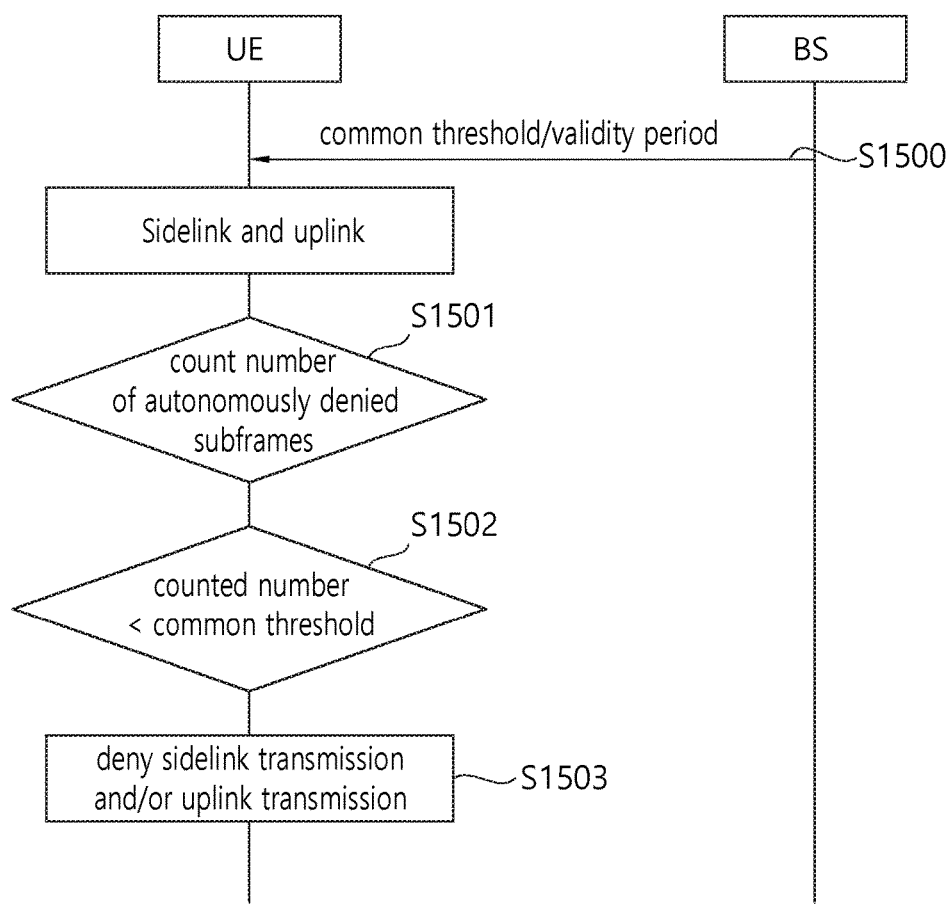
FIG. 15 shows an example of interference prevention using the number of autonomously denied subframes according to an embodiment of the present invention.

FIG. 15 shows an example of interference prevention using the number of autonomously denied subframes according to an embodiment of the present invention.

Referring to FIG. 15, a UE may receive a common threshold and a common validity period from a BS (S1500). The threshold may be the maximum number of subframes assigned for sidelink transmission and/or uplink transmission which is allowed for the UE to deny scheduled sidelink transmission and/or uplink transmission. The UE may count the number of denials of subframes for any scheduled transmission (including sidelink transmission and uplink transmission) during the validity period including previous subframes and a current subframe (S1501). When reception of another communication module in the UE is expected to receive interference by sidelink transmission and uplink transmission (or receives interference), if denials for sidelink transmission and uplink transmission occur at the same subframe to prevent interference, the UE may count the denials as one denial or may count the denials as two denials. When the number of denials of subframes for sidelink transmission and uplink transmission is less than the threshold (S1502), the UE may deny any scheduled transmission at the current subframe (S1503). That is, the UE may deny sidelink transmission or scheduled uplink transmission at the current subframe or may deny both sidelink transmission and scheduled uplink transmission at the current subframe.

Figure 16:
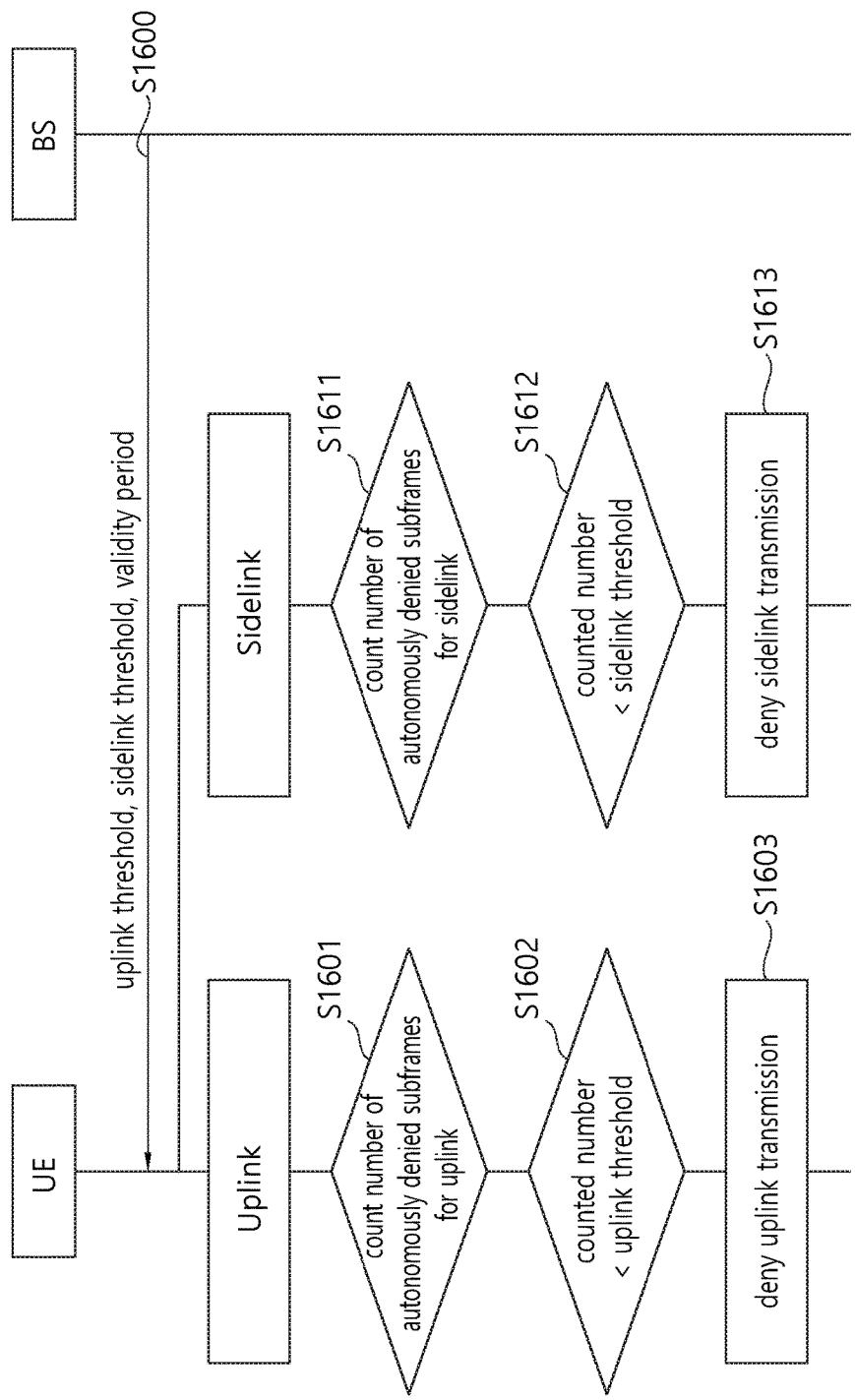
FIG. 16 shows another example of interference prevention using the number of autonomously denied subframes according to an embodiment of the present invention.

FIG. 16 shows another example of interference prevention using the number of autonomously denied subframes according to an embodiment of the present invention.

Referring to FIG. 16, a UE may receive an uplink threshold, a sidelink threshold, and a validity period from a BS (S1600). The uplink threshold may be the maximum number of subframes assigned for uplink transmission which is allowed for the UE to deny scheduled uplink transmission. The sidelink threshold may be the maximum number of subframes assigned for sidelink transmission which is allowed for the UE to deny scheduled sidelink transmission. The UE may separately count the number of denials of subframes for sidelink transmission and the number of denials of subframes for uplink transmission during the validity period including previous subframes and a current subframe (S1601 and S1611). Uplink thresholds and sidelink thresholds for the respective links may be the same or different. When the counted number of denials of subframes for uplink transmission is less than a threshold for uplink transmission (S1602), the UE may deny scheduled uplink transmission at the current subframe (S1603). When the counted number of denials of subframes for sidelink transmission is less than a threshold for sidelink transmission (S1612), the UE may deny sidelink transmission at the current subframe (S1613).

Figure 17:
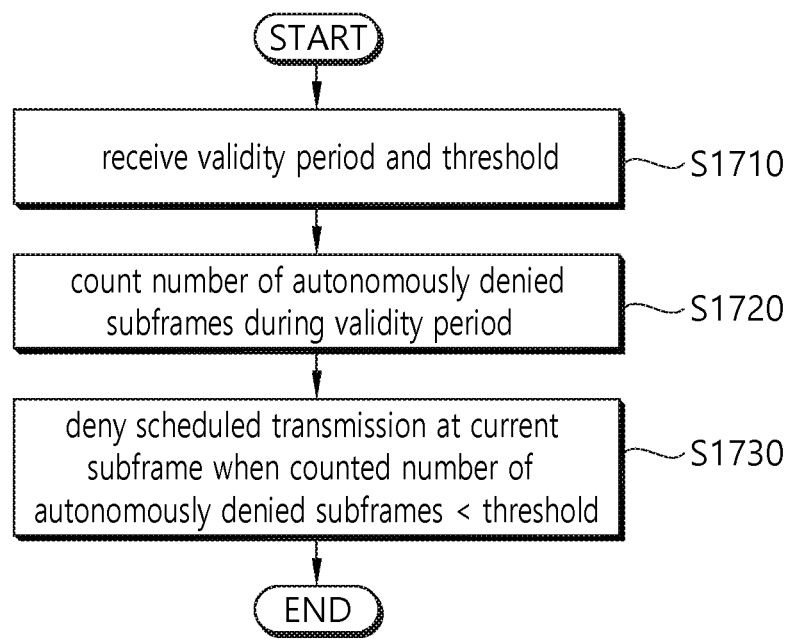
FIG. 17 is a block diagram illustrating a method for denying transmission at a subframe according to an embodiment of the present invention.

FIG. 17 is a block diagram illustrating a method for denying transmission at a subframe according to an embodiment of the present invention.

Referring to FIG. 17, a UE may receive a validity period and a threshold (S1710). The validity period and the threshold may be received from a network through dedicated signaling or broadcast signaling, or may be received from the network through both dedicated signaling and broadcast signaling. When the validity period and the threshold are received through dedicated signaling, the values received through dedicated signaling are applied. When sidelink transmission and uplink transmission occur at the same subframe during the validity period, the UE may autonomously deny the uplink transmission. The UE may count the number of autonomously denied subframes during the validity period (S1720). The validity period may include previous subframes and the current subframe and may be defined by subframes. When the counted number of autonomously denied subframes is less than the threshold, the UE may deny transmission at the current subframe (S1730).

When the threshold value is the maximum number of subframes assigned for uplink transmission which is allowed for the UE to deny scheduled uplink transmission and the number of autonomously denied subframes is the number of denials of subframes for an uplink, the UE may deny uplink transmission at the current subframe.

When the threshold value is the maximum number of subframes assigned for sidelink transmission which is allowed for the UE to deny scheduled sidelink transmission and the number of autonomously denied subframes is the number of denials of subframes for a sidelink, the UE may deny sidelink transmission at the current subframe.

The UE may further calculate a denial rate, which is defined by the value of the counted number of autonomously denied subframes divided by the validity period in the foregoing procedure. In this case, the UE may compare the calculated denial rate with the threshold, and may deny transmission at the current subframe when the calculated denial rate is less than the threshold.

Figure 18:
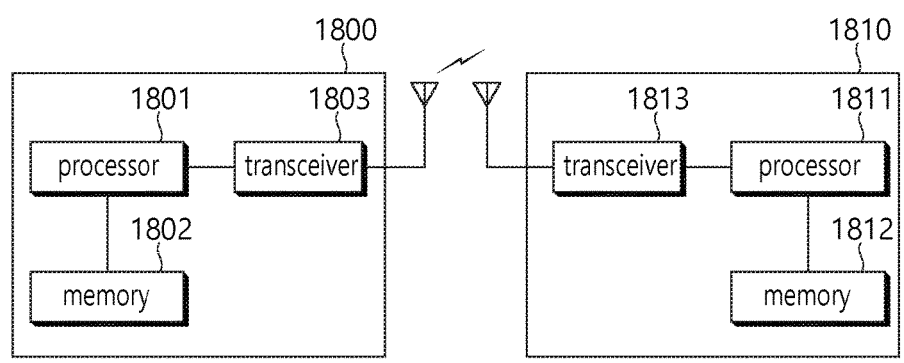
FIG. 18 is a block diagram illustrating a wireless communication system according to one embodiment of the present specification.

FIG. 18 is a block diagram illustrating a wireless communication system according to the embodiment of the present invention.

A BS 1800 includes a processor 1801, a memory 1802 and a transceiver 1803. The memory 1802 is connected to the processor 1801, and stores various pieces of information for driving the processor 1801. The transceiver 1803 is connected to the processor 1801, and transmits and/or receives radio signals. The processor 1801 implements proposed functions, processes and/or methods. In the above embodiment, an operation of the base station may be implemented by the processor 1801.

A UE 1810 includes a processor 1811, a memory 1812 and a transceiver 1813. The memory 1812 is connected to the processor 1811, and stores various pieces of information for driving the processor 1811. The transceiver 1813 is connected to the processor 1811, and transmits and/or receives radio signals. The processor 1811 implements proposed functions, processes and/or methods. In the above embodiment, an operation of the base station may be implemented by the processor 1811.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for denying, by a user equipment (UE), transmission in a wireless communication system, the method comprising:
   receiving a validity period and a threshold, wherein the threshold is a maximum number of subframes, assigned for uplink transmission that the UE is allowed to deny for a scheduled uplink transmission;
   counting a number of autonomously denied subframes during the validity period, wherein the number of autonomously denied subframes is the number of subframes denied for the uplink transmission when the uplink transmission and a sidelink transmission occur at the same subframe; and
   denying the uplink transmission at a current subframe when the number of autonomously denied subframes is less than the threshold.

2. The method of claim 1, wherein the validity and the threshold are received from a network through dedicated signaling or broadcast signaling, or are received from the network through both dedicated signaling and broadcast signaling.

3. The method of claim 2, wherein when the validity and the threshold are received from the network through both dedicated signaling and broadcast signaling, the validity and the threshold are values received through dedicated signaling.

4. A user equipment (UE) for denying transmission in a wireless communication system, the UE comprising:
   a memory;
   a transceiver; and
   a processor, operatively coupled to the memory and the transceiver, wherein the processor is configured to:
   control the transceiver to receive a validity period and a threshold, wherein the threshold is a maximum number of subframes, assigned for uplink transmission that the UE is allowed to deny for a scheduled uplink transmission,
   count a number of autonomously denied subframes during the validity period, wherein the number of autonomously denied subframes is the number of subframes denied for the uplink transmission when the uplink transmission and a sidelink transmission occur at the same subframe, and
   deny the uplink transmission at a current subframe when the number of autonomously denied subframes is less than the threshold.

5. The UE of claim 4, wherein the validity and the threshold are received from a network through dedicated signaling or broadcast signaling, or are received from the network through both dedicated signaling and broadcast signaling.

6. The UE of claim 5, wherein when the validity and the threshold are received from the network through both dedicated signaling and broadcast signaling, the validity and the threshold are values received through dedicated signaling.

7. A method for denying, by a user equipment (UE), transmission in a wireless communication system, the method comprising:
   receiving a validity period and a threshold, wherein the threshold is a maximum number of subframes, assigned for sidelink transmission that the UE is allowed to deny for a scheduled sidelink transmission;
   counting a number of autonomously denied subframes during the validity period, wherein the number of autonomously denied subframes is the number of subframes denied for the sidelink transmission when an uplink transmission and the sidelink transmission occur at the same subframe; and
   denying the sidelink transmission at a current subframe when the number of autonomously denied subframes is less than the threshold.

8. The method of claim 7, wherein the validity and the threshold are received from a network through dedicated signaling or broadcast signaling, or are received from the network through both dedicated signaling and broadcast signaling.

9. The method of claim 8, wherein when the validity and the threshold are received from the network through both dedicated signaling and broadcast signaling, the validity and the threshold are values received through dedicated signaling.

* * * * *